United States Patent
Nayak et al.

(10) Patent No.: US 11,335,192 B1
(45) Date of Patent: May 17, 2022

(54) SYSTEM, METHOD, AND COMPUTER PROGRAM PRODUCT FOR DETECTING A DRIVING DIRECTION

(71) Applicant: HERE Global B.V., Eindhoven (NL)

(72) Inventors: Amarnath Nayak, Mumbai (IN); Leon Stenneth, Chicago, IL (US); Alex Averbuch, Buffalo Grove, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 17/110,041

(22) Filed: Dec. 2, 2020

(51) Int. Cl.
*G08G 1/01* (2006.01)
*G08G 1/056* (2006.01)
*B60W 50/14* (2020.01)

(52) U.S. Cl.
CPC .............. *G08G 1/056* (2013.01); *B60W 50/14* (2013.01); *G08G 1/0112* (2013.01); *B60W 2520/06* (2013.01)

(58) Field of Classification Search
CPC ..... G08G 1/056; G08G 1/0112; B60W 50/14; B60W 2520/06
See application file for complete search history.

(56) References Cited

U.S. PATENT DOCUMENTS

| | | | |
|---|---|---|---|
| 9,638,532 B2 | 5/2017 | Higuchi | |
| 2007/0250263 A1* | 10/2007 | Yamada | B60Q 1/085 701/408 |
| 2016/0003630 A1* | 1/2016 | Higuchi | G08G 1/16 701/41 |
| 2019/0189003 A1 | 6/2019 | Geisler | |

FOREIGN PATENT DOCUMENTS

| | | |
|---|---|---|
| JP | 2009140008 A | 6/2009 |
| WO | 2019115309 A1 | 6/2019 |

OTHER PUBLICATIONS

Wang et al., abstract of "Potential Enhancement for Wrong-way Driver Detection using Precise Attribute Information", vol. 73, Issue 2, Mar. 2020, retrieved from https://www.cambridge.org/core/journals/journal-of-navigation/article/potential-enhancement-for-wrongway-driver-detection-using-precise-attribute-information/21973A007449EDFA5D554DE47CB247AA, pp. 1-6.

* cited by examiner

*Primary Examiner* — Tai T Nguyen
(74) *Attorney, Agent, or Firm* — Ditthavong, Steiner & Mlotkowski

(57) ABSTRACT

A system, a method, and a computer program product are disclosed for detecting a driving direction. The system may include: a memory to store computer-executable instructions; and one or more processors to execute the instructions to receive sensor data associated with a plurality of locations and determine trajectory data associated with the plurality of locations based on the sensor data and map data. Further, the one or more processors may execute the instructions to identify, based on the trajectory data, a set of unmatched locations from the plurality of locations. The set of unmatched locations comprises at least a first predetermined number of unmatched locations. Furthermore, the one or more processors may execute the instructions to detect the driving direction based on the set of unmatched locations and the map data.

20 Claims, 8 Drawing Sheets

SYSTEM, METHOD, AND COMPUTER PROGRAM PRODUCT FOR DETECTING A DRIVING DIRECTION

TECHNOLOGICAL FIELD

The present disclosure generally relates to routing and navigation systems, and more particularly relates to detecting a driving direction for routing and navigation systems.

BACKGROUND

Accidents are a major cause of concern while driving, for both users and vehicle makers, worldwide. The serious implications of accidents, particularly the risk of accidents being fatal, is a grave concern and one of the most important safety parameters that all the concerned parties: vehicle owners, vehicle makers and vehicle navigation service providers, want to ensure. Research has shown that over the last few decades, 5% of worldwide accidents have been caused by wrong way driving. The wrong way driving may occur when a driver, operating a vehicle, is traveling in a wrong driving direction on a road segment. The wrong way driving direction may be a travel direction that is opposite to a legal travel direction of the road segment. A driver's perception is at most important to detect if a driving direction of the vehicle is a right way driving direction (i.e. traveling in legal travel direction) or the wrong way driving direction. However, the driver may be confused due to complex road geometries, placement of a new link, driving under dark or severe weather conditions, and the like.

This confusion may lead to accidents, causing serious harm to users and vehicles alike, and should be avoided.

BRIEF SUMMARY OF SOME EXAMPLE EMBODIMENTS

In case of accidents caused by wrong way driving, the underlying cause could be that the detection of the driving direction as the right way driving direction or the wrong way driving direction becomes a challenging task due to complex road geometries. Further, the detection of driving direction of the vehicle as the right way driving direction or the wrong way driving direction becomes even more challenging in autonomous driving applications.

In order to solve the foregoing problem, the present disclosure provides a system that may detect the driving direction, based on sensor data collected from sensors of the vehicle such that unwanted conditions such as road accidents, head-on collisions of vehicles, fatalities and the like are avoided irrespective of complexity of the road geometry and/or the atmospheric conditions.

Various embodiments are provided herein for receiving the sensor data associated with a plurality of locations. As used herein, the plurality of locations may be locations of the vehicle on a particular link. In various embodiments, the sensor data associated with a location of the vehicle may be received at a predefined high frequency of say one Hertz. In other words, the sensor data may be continuously received for every second. The sensor data, for each location of the plurality of locations, may comprise a high frequency GPS data, a timestamp data, a heading degree data or a combination thereof.

Various embodiments are provided for determining trajectory data associated with the plurality of locations, based on the sensor data and map data. In various embodiments, valid path data associated with the plurality of locations may be determined based on map data.

Various embodiments are provided for identifying, based on the trajectory data, a set of unmatched locations from the plurality of locations. The set of unmatched locations may comprise at least a first predetermined number of unmatched locations. In various embodiments, each of the plurality of locations may be map-matched using the sensor data and the map data to identify that these locations are aligned with a valid path data, and thus, form a matched location. In various embodiments, one or more locations of the plurality of locations may not be map-matched if the vehicle is not traveling in a legal or a valid travel direction of a particular link. To that end, the one or more locations of the plurality of locations that are not map-matched and thus are not aligned with valid path data may be identified as the first predetermined number of unmatched locations. In various embodiments, the first predetermined number of unmatched locations may be consecutive locations.

Various embodiments are provided for detecting the driving direction based on the set of unmatched locations and the map data. In various embodiments, a link associated with each of the first predetermined number of unmatched locations may be determined and first heading data associated with the link may be compared with second heading data associated with each of the first predetermined number of unmatched locations for detecting the diving direction. Further, if the driving direction is detected as the wrong way driving, the detected driving direction may be rendered as a notification response and/or control signal(s) such that the unwanted conditions such as road accidents, head-on collisions of vehicles, fatalities and the like are avoided irrespective of complexity of the road geometry and/or the atmospheric conditions.

A system, a method and a computer programmable product are provided in accordance with an example embodiment described herein for detecting a driving direction.

In one aspect, a system for detecting a driving direction is disclosed. The system may comprise: a memory configured to store computer-executable instructions; and one or more processors may be configured to execute the instructions to: receive sensor data associated with a plurality of locations; determine trajectory data associated with the plurality of locations based on the sensor data and map data; identify, based on the trajectory data, a set of unmatched locations from the plurality of locations, wherein the set of unmatched locations comprises at least a first predetermined number of unmatched locations; and detect the driving direction based on the set of unmatched locations and the map data.

According to some embodiments, the one or more processors are further configured to: determine a link associated with each of the at least first predetermined number of unmatched locations in the set of unmatched locations; and determine first heading data associated with the link based on the map data.

According to some embodiments, the one or more processors are further configured to: determine second heading data based on the sensor data, wherein the second heading data is associated with a vehicle associated with the sensor data; calculate a heading difference data between the first heading data and the second heading data; and detect the driving direction based on the heading difference data.

According to some embodiments, the one or more processors are further configured to detect the driving direction as a right way driving direction in response to determining that the heading difference data is within a first heading range.

According to some embodiments, the one or more processors are further configured to detect the driving direction as an uncertain driving direction in response to determining that the heading difference data is within at least one of a second heading range and a third heading range.

According to some embodiments, the one or more processors are further configured to: determine whether the heading difference data is within a fourth heading range; increment a counter value based on the determination; compare the counter value with a predetermined counter threshold value; and detect the driving direction as a wrong way driving direction based on the comparison.

According to some embodiments, the one or more processors are further configured to generate a notification response based on the detection of the wrong way driving direction, wherein the notification response comprises at least one of an alert message, an audio message indicating wrong way driving, a visual message indicating wrong way driving, and a navigation instruction related to wrong way driving.

According to some embodiments, the received sensor data for the plurality of locations may comprise, for each location in the plurality of locations, high frequency GPS data, timestamp data, heading degree data or a combination thereof.

According to some embodiments, the one or more processors are further configured to: determine a valid path data associated with the plurality of locations based on the map data; determine the trajectory data associated with the plurality of locations based on the sensor data and the map data, wherein the trajectory data comprises data corresponding to an actual path constructed using the plurality of locations; compare the valid path data and the trajectory data; and determine the set of unmatched locations based on the comparison, wherein the set of unmatched locations comprise at least the first predetermined number of unmatched locations associated with the trajectory data that are not aligned with the valid path data.

According to some embodiments, the one or more processors are further configured to: determine a distance between each location from the plurality of locations and a location associated with the trajectory data; compare the distance with a threshold distance; and identify the first predetermined number of unmatched locations based on the comparison, wherein for each location in the first predetermined number of unmatched locations the distance is more than the threshold distance, and wherein the first predetermined number of locations are consecutive locations.

In another aspect, a method for detecting a driving direction is disclosed. The method may comprise: receiving sensor data associated with a plurality of locations; determining trajectory data associated with the plurality of locations based on the sensor data and map data; identifying, based on the trajectory data, a set of unmatched locations from the plurality of locations, wherein the set of unmatched locations comprises at least a first predetermined number of unmatched locations; and detecting the driving direction based on the set of unmatched locations and the map data.

According to some embodiments, the method may further comprise: determining a link associated with each of the at least first predetermined number of unmatched locations in the set of unmatched locations; and determining a first heading data associated with the link based on the map data.

According to some embodiments, the method further comprises: determining second heading data based on the sensor data, wherein the second heading data is associated with a vehicle associated with the sensor data; calculating a heading difference data between the first heading data and the second heading data; and detecting the driving direction based on the heading difference data.

According to some embodiments, the method further comprises detecting the driving direction as a right way driving direction in response to determining that the heading difference data is within a first heading threshold range, wherein the first heading threshold range is a heading degree range from a first upper threshold value to a first lower threshold value.

According to some embodiments, the method further comprises detecting the driving direction as an uncertain driving direction in response to determining that the heading difference data is within at least one of a second heading threshold range and a third heading threshold range, wherein the second heading threshold range is a heading degree range from a second upper threshold value to a second lower threshold value, and wherein the third heading threshold range is a heading degree range from a third upper threshold value to a third lower threshold value.

According to some embodiments, the method further comprises: determining whether the heading difference data is within a fourth heading threshold range, wherein the fourth heading threshold range is a heading degree range from a fourth upper threshold value to a fourth lower threshold value; incrementing a counter value based on the determination; comparing the counter value with a predetermined counter threshold value; and detecting the driving direction as a wrong way driving direction based on the comparison.

According to some embodiments, the method further comprises generating a notification response based on the detection of the wrong way driving direction, wherein the notification response comprises at least one of an alert message, an audio message indicating wrong way driving, a visual message indicating wrong way driving, and a navigation instruction related to wrong way driving.

According to some embodiments, the method further comprises: determining a valid path data associated with the plurality of locations based on the map data; determining the trajectory data associated with the plurality of locations based on the sensor data and map data, wherein the trajectory data comprises data corresponding to an actual path constructed using the plurality of locations; comparing the valid path data and the trajectory data; and determining the set of unmatched locations based on the comparison, wherein the set of unmatched locations comprise at least the first predetermined number of unmatched locations associated with the trajectory data that are not aligned with the valid path data According to some embodiments, the method further comprises: determining a distance between each location from the plurality of locations and a location associated with the trajectory data; comparing the distance with a threshold distance; and identifying the first predetermined number of unmatched locations based on the comparison, wherein for each location in the first predetermined number of unmatched locations the distance is more than the threshold distance, and wherein the first predetermined number of locations are consecutive locations.

In yet another aspect, a computer program product comprising a non-transitory computer readable medium having stored thereon computer executable instruction which when executed by one or more processors, cause the one or more processors to carry out operations for detecting a driving direction, the operations may comprise: receiving sensor data associated with a plurality of locations; determining trajectory data associated with the plurality of locations based on the sensor data and map data; identifying, based on the trajectory data, a set of unmatched locations from the plurality of locations, wherein the set of unmatched locations comprises at least a first predetermined number of unmatched locations; and detecting the driving direction based on the set of unmatched locations and the map data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Figure 1:
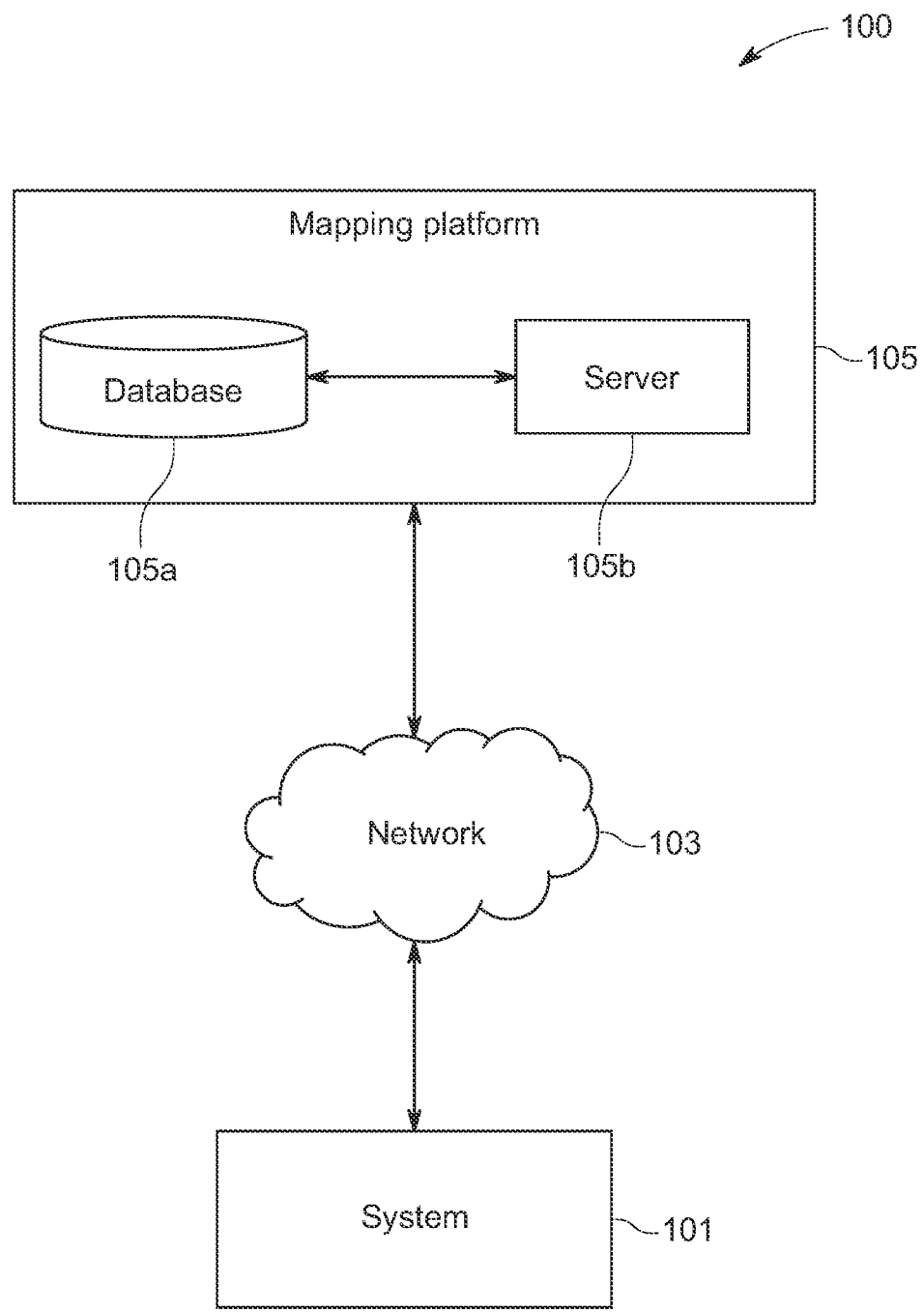
Figure 2:
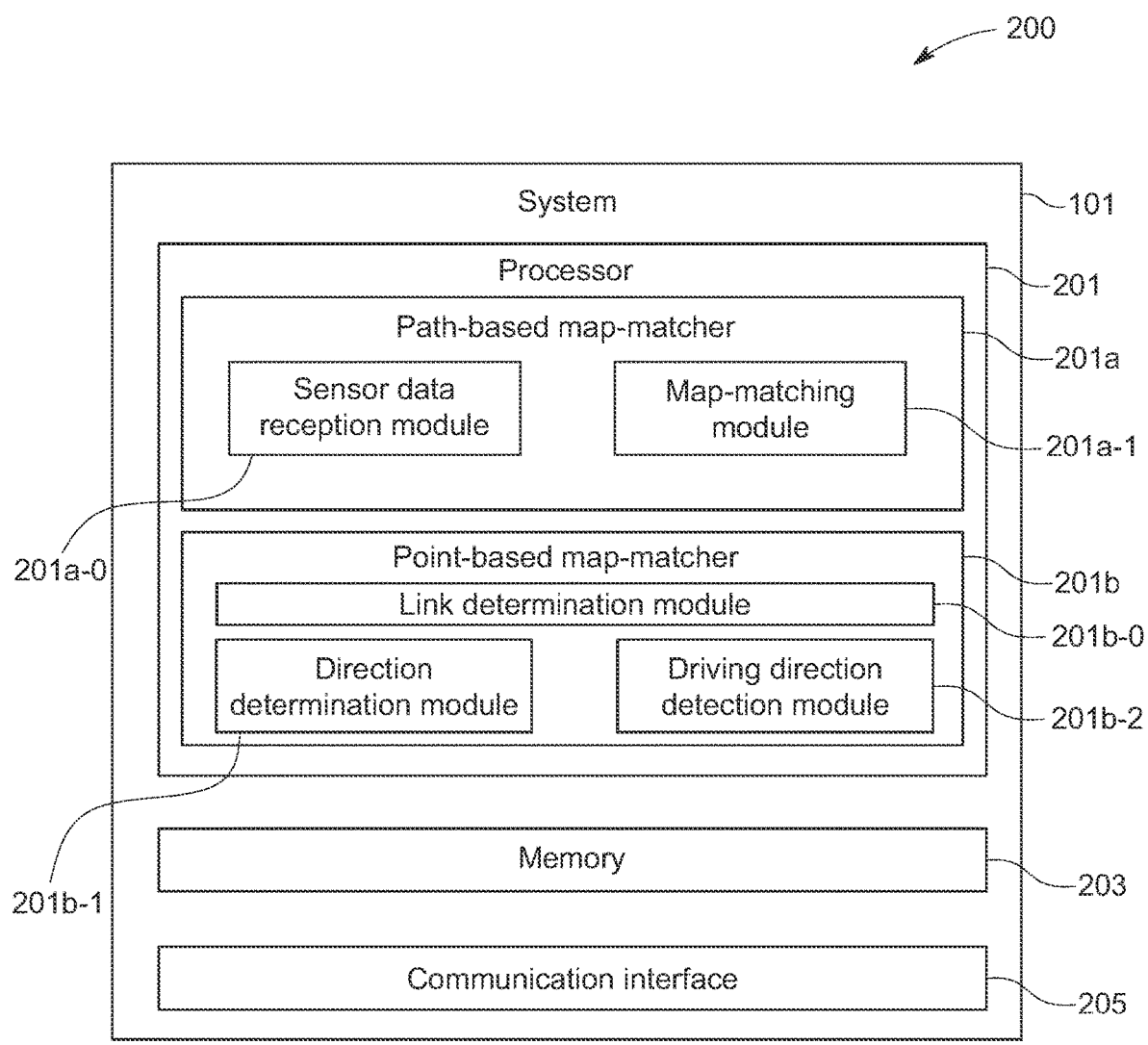
Figure 3A:
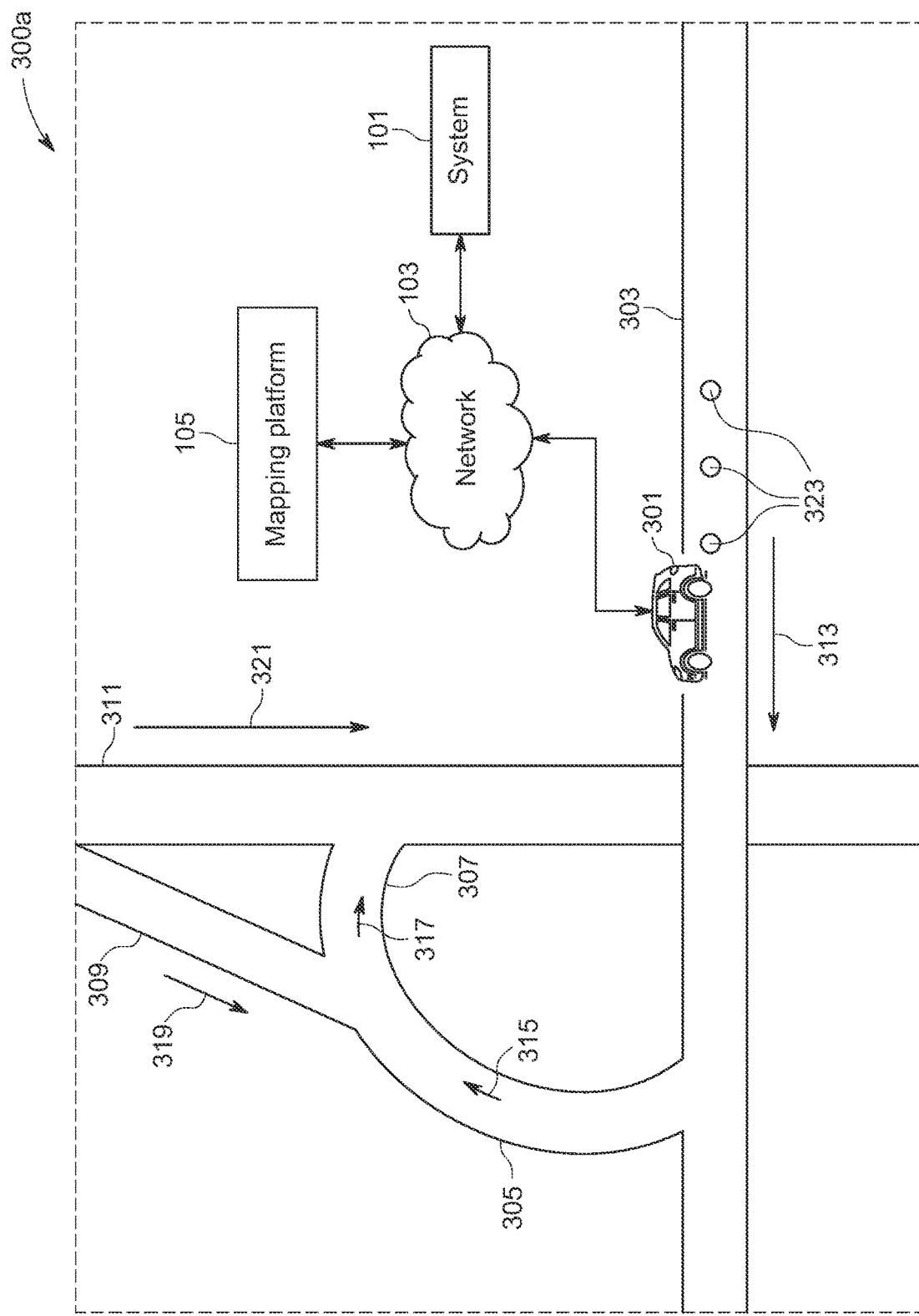
Figure 3B:
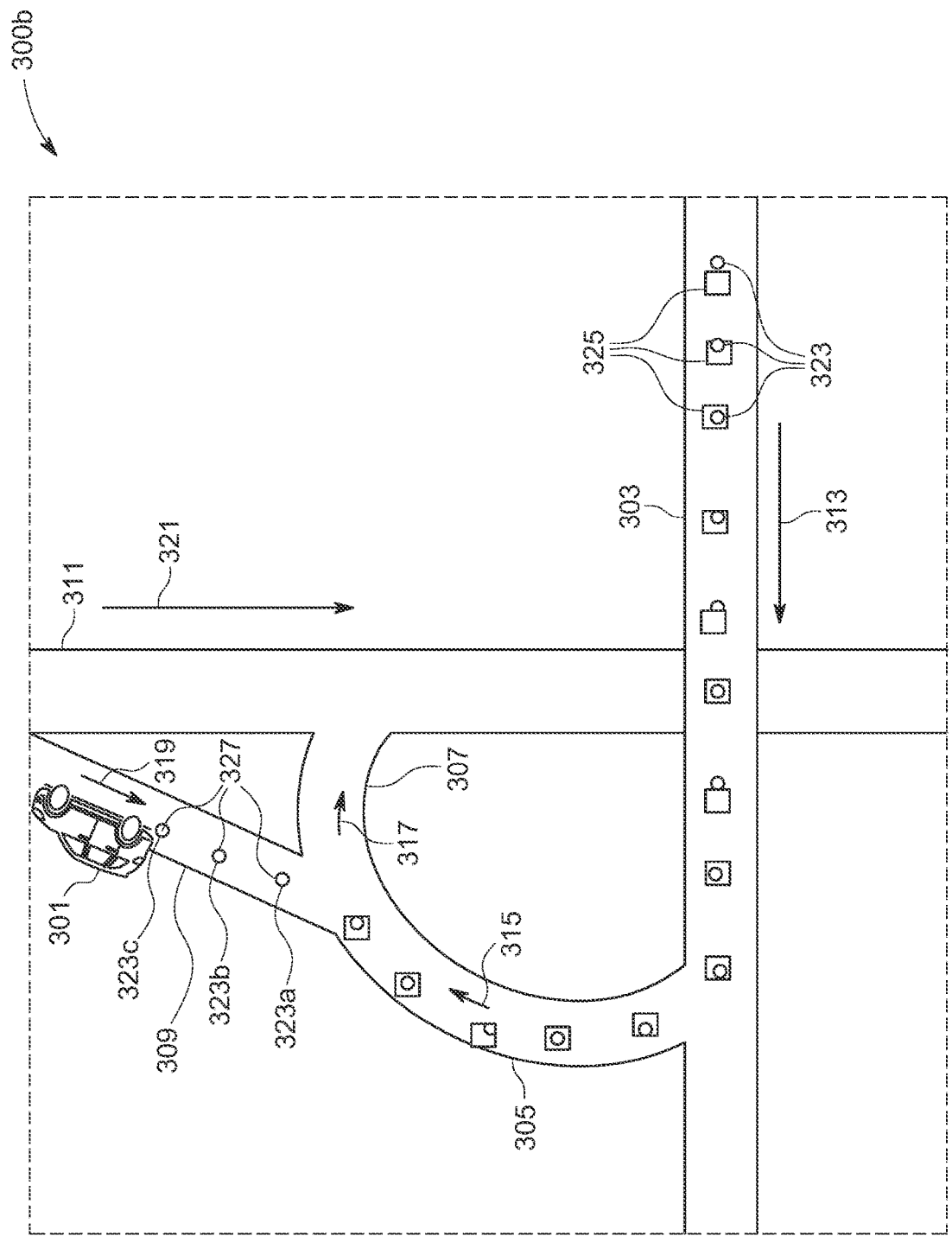
Figure 3C:
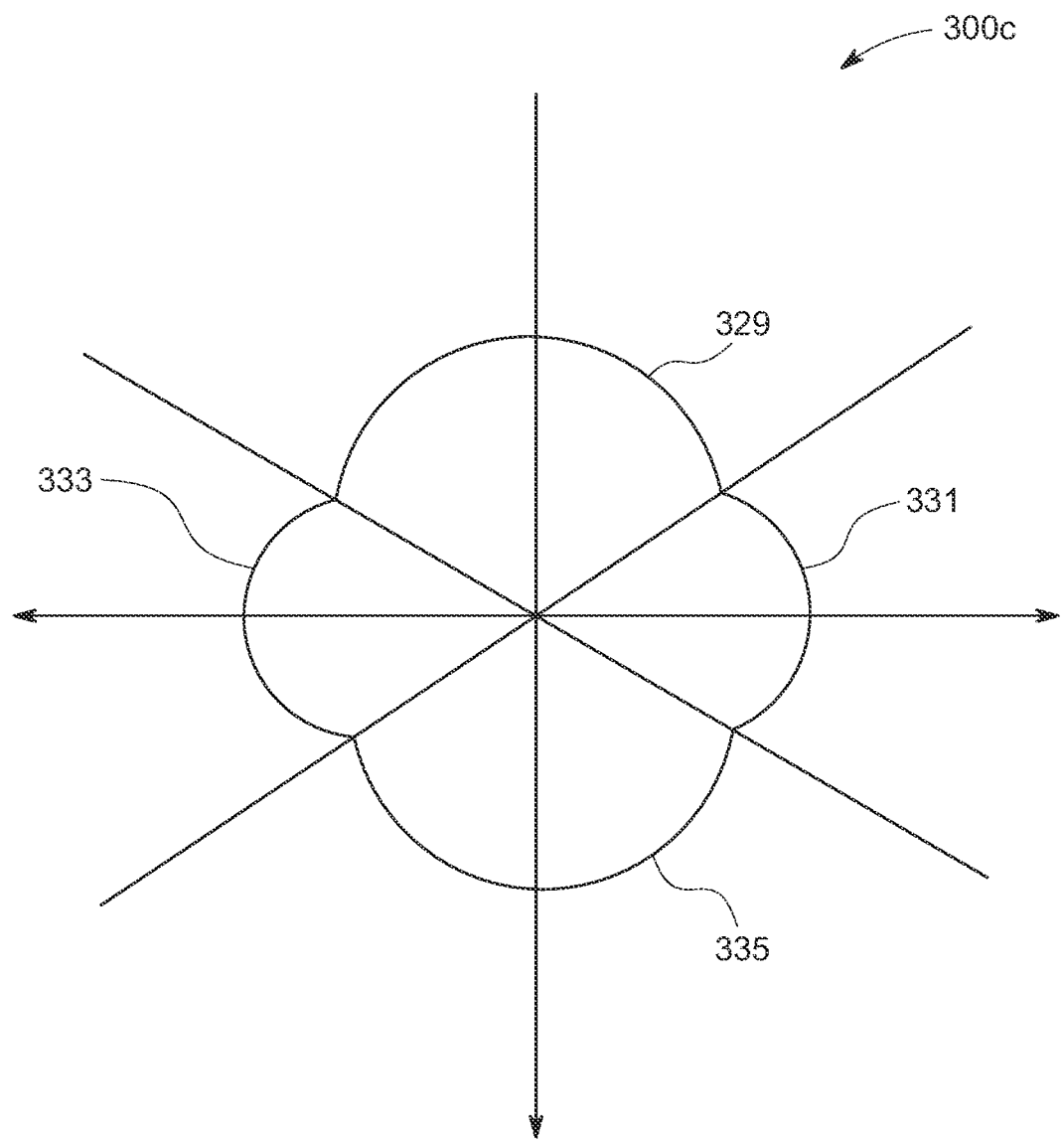
Figure 4A:
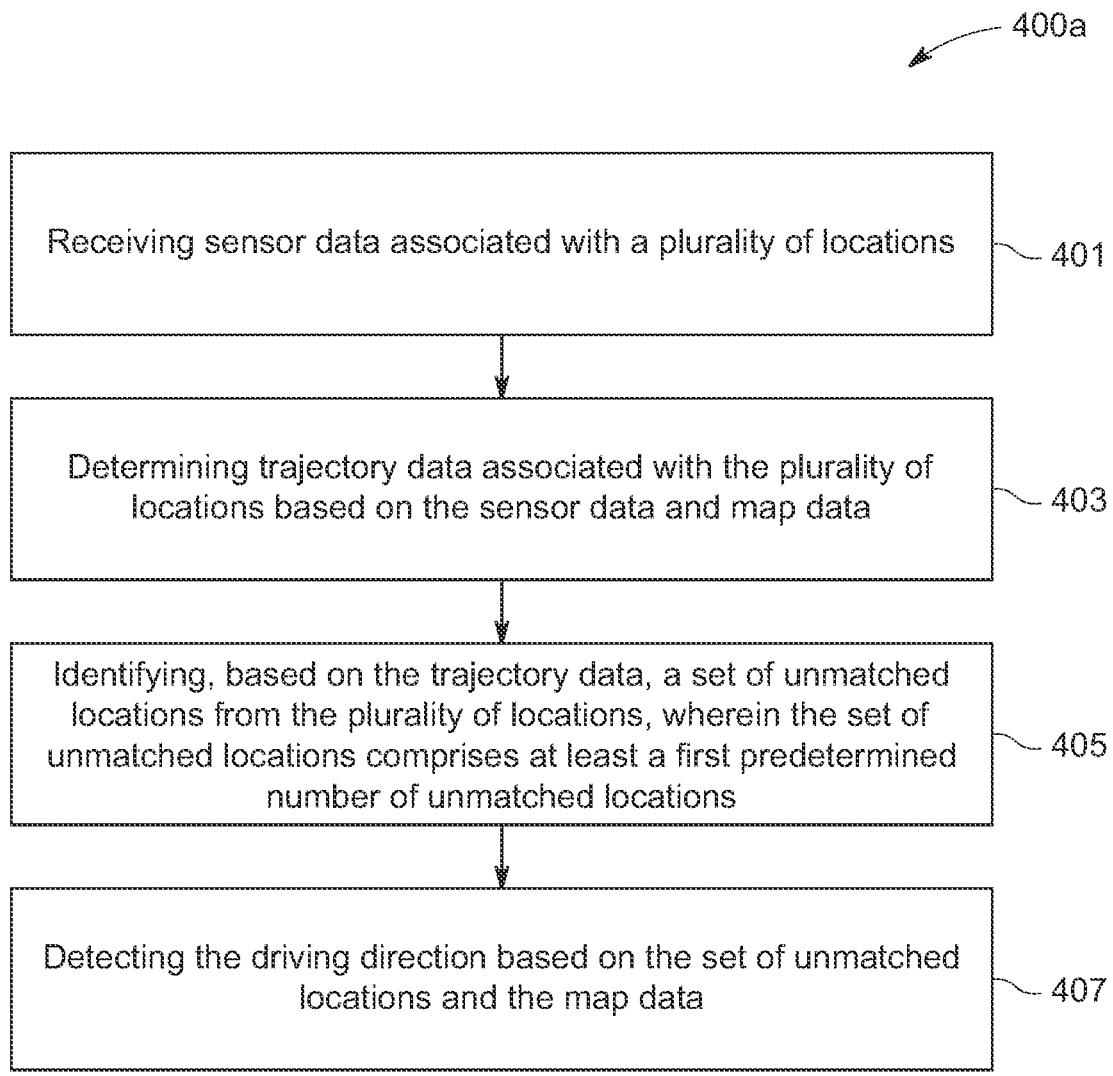
Figure 4B:
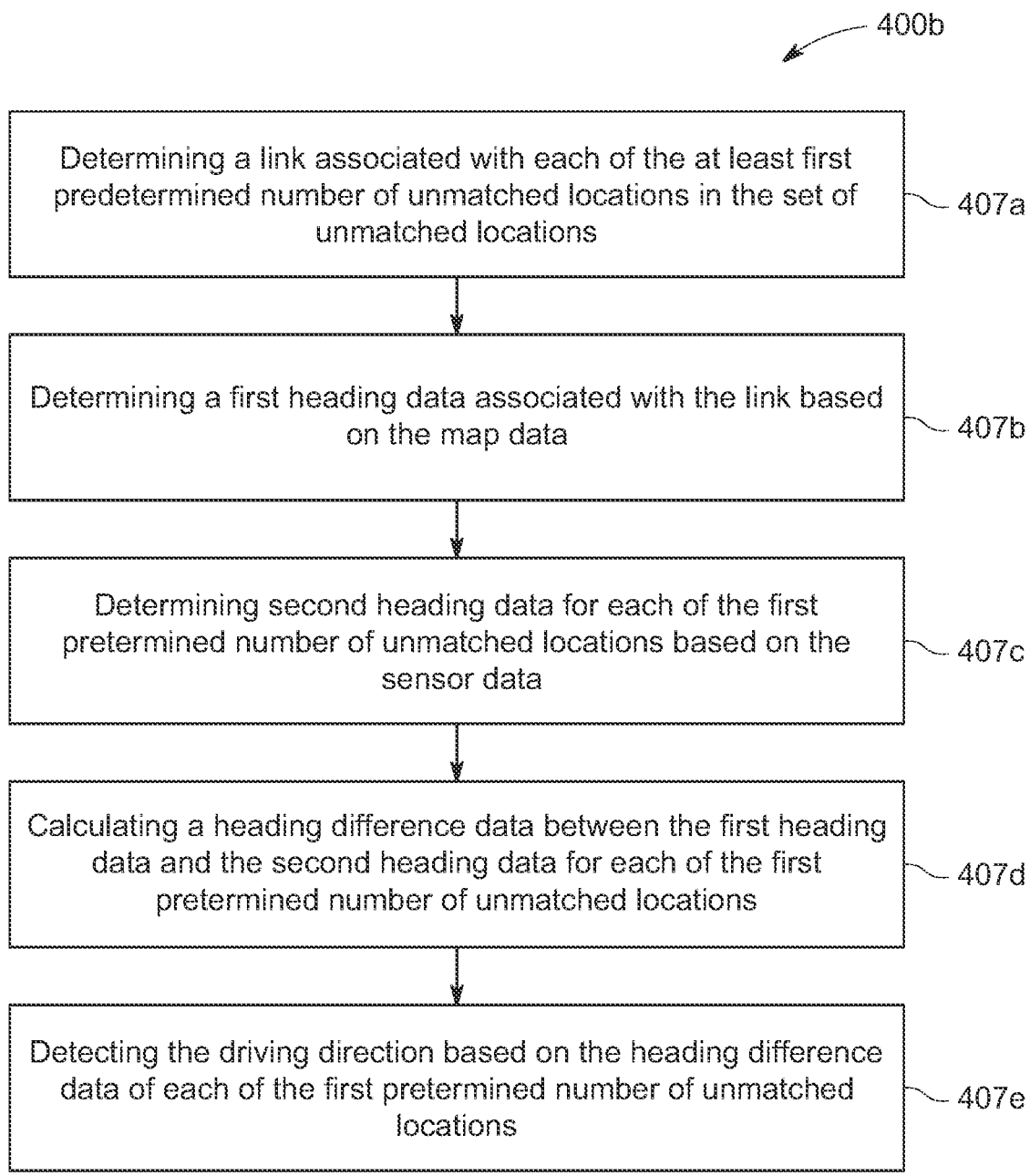
Figure 4C:
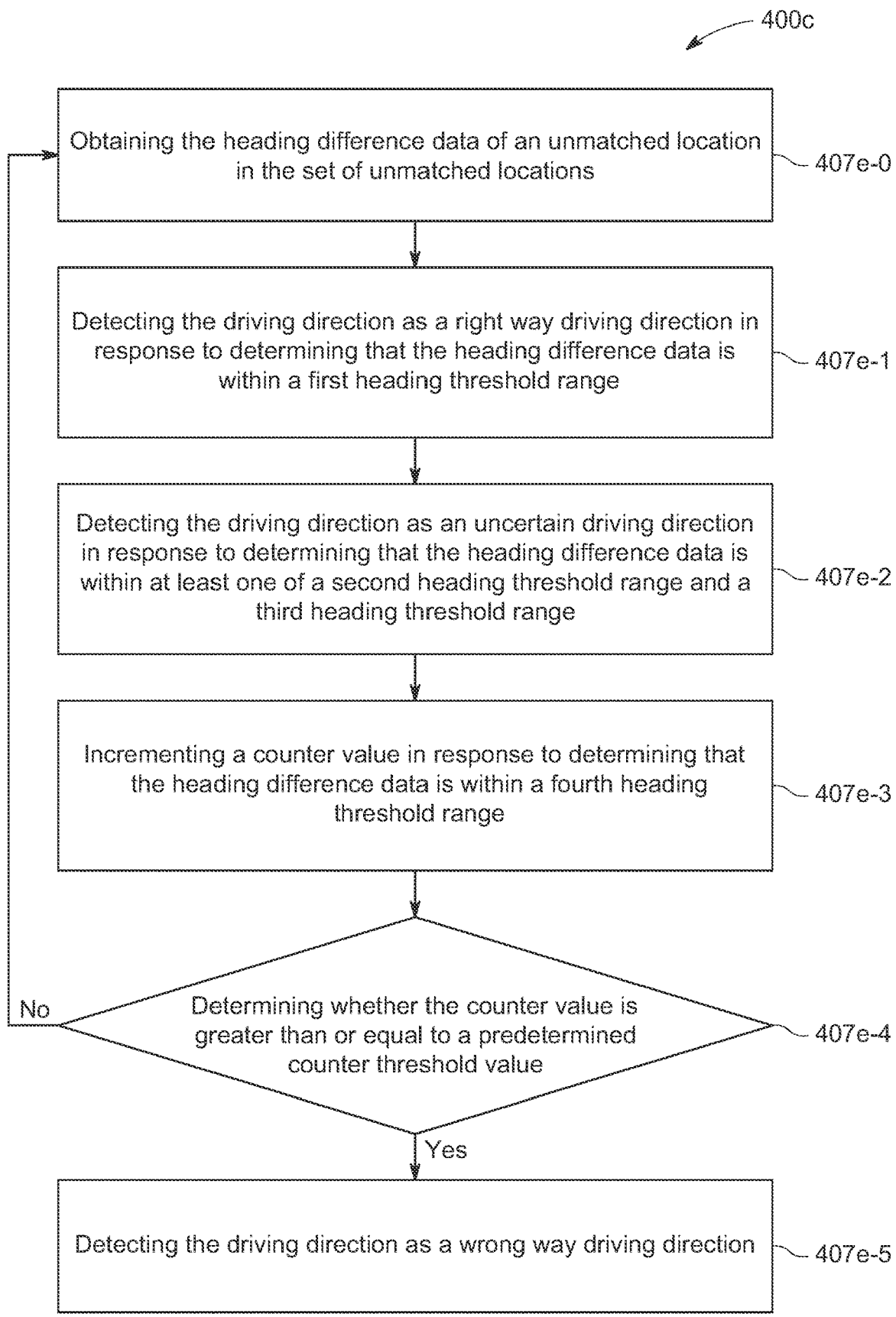

Having thus described example embodiments of the invention in general terms, reference will now be made to the accompanying drawings, which are not necessarily drawn to scale, and wherein:

FIG. 1 illustrates a block diagram showing an example architecture of a system for detecting a driving direction, in accordance with one or more example embodiments;

FIG. 2 illustrates a block diagram of the system for detecting the driving direction, in accordance with one or more example embodiments;

FIG. 3A illustrates an exemplary working environment of the system for obtaining sensor data, in accordance with one or more example embodiments;

FIG. 3B illustrates an exemplary working environment of the system for detecting the driving direction, in accordance with one or more example embodiments;

FIG. 3C illustrates a graphical representation of various heading threshold ranges for detecting the driving direction, in accordance with one or more example embodiments;

FIG. 4A illustrates a flowchart depicting a method for detecting the driving direction, in accordance with one or more example embodiments;

FIG. 4B illustrates a flowchart depicting a method for detecting the driving direction based on the set of unmatched locations and map data, in accordance with one or more example embodiments; and FIG. 4C illustrates a flowchart depicting a method for detecting the driving direction based on a heading difference data of each of the locations in the set of unmatched locations, in accordance with one or more example embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

A system, a method, and a computer program product are provided for detecting a driving direction. Various embodiments are provided for receiving the sensor data associated with a plurality of locations. As used herein, the plurality of locations may be locations of the vehicle on a particular link. In various embodiments, the sensor data associated with a location of the vehicle may be received at predefine frequency of say one Hertz. In other words, the sensor data may be continuously received for every second. The sensor data, for each location of the plurality of locations, may comprise a high frequency GPS data, a timestamp data, a heading degree data or a combination thereof.

Various embodiments are provided for determining trajectory data associated with the plurality of locations, based on the sensor data and map data. In various embodiments, valid path data associated with the plurality of locations is determined based on map data. Map data comprises data about valid and invalid paths, based on what is legal and what is not legal respectively, to follow based on predetermined and pre-stored path geometries and permissible driving direction on those path geometries.

Various embodiments are provided for identifying, based on the trajectory data, a set of unmatched locations from the plurality of locations. The set of unmatched locations may comprise at least a first predetermined number of unmatched locations. In various embodiments, each of the plurality of locations may be map-matched using the sensor data and the map data to identify a matched location. In various embodiments, one or more locations of the plurality of locations may not be map-matched because such one or more locations are not aligned with valid path data available for those locations, if the vehicle is not traveling in a legal travel direction of a particular link. To that end, the one or more locations of the plurality of locations that are not map-matched may be identified as the first predetermined number of unmatched locations. In various embodiments, the first predetermined number of unmatched locations could be consecutive locations.

Various embodiments are provided for detecting the driving direction based on the set of unmatched locations and the map data. In various embodiments, a link associated with each of the first predetermined number of unmatched locations may be determined and first heading data associated with the link may be compared with second heading data associated with each of the first predetermined number of unmatched locations for detecting the diving direction. Further, the detected driving direction may be rendered as a notification response and/or control signal(s), if the driving direction is detected as the wrong way driving such that the unwanted conditions such as road accidents, head-on collisions of vehicles, fatalities and the like are avoided irrespective of complexity of the road geometry and/or the atmospheric conditions.

FIG. 1 illustrates a block diagram 100 showing an example architecture of a system 101 for detecting a driving direction, in accordance with one or more example embodiments. As illustrated in FIG. 1, the block diagram 100 may comprise the system 101, a network 103, and a mapping platform 105. The mapping platform 105 may further comprise a map database 105a (also referred to as a database 105a) and a server 105b. In various embodiments, the system 101 may be onboard a vehicle, such as the system 101 may be a navigation system installed in the vehicle for detecting the driving direction. In various embodiments, the vehicle may be an autonomous vehicle, a semiautonomous vehicle, or a manual vehicle. In some embodiments, the system 101 may be the server 105b of the mapping platform 105 and therefore may be co-located with or within the mapping platform 105. In some other embodiments, the system 101 may be an OEM (Original Equipment Manufacturer) cloud. The system 101 may be communicatively coupled with the mapping platform 105 over the network 103.

The network 103 may be wired, wireless, or any combination of wired and wireless communication networks, such as cellular, Wi-Fi, internet, local area networks, or the like. In some embodiments, the network 103 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

The system 101 may communicate with the mapping platform 105, via the network 103, where the mapping platform 105 may comprise the map database 105a for storing map data, and the processing server 105b for carrying out the processing functions associated with the mapping platform 105. The map database 105a may store node data, road segment data or link data, point of interest (POI) data, road obstacles related data, traffic objects related data, posted signs related data, such as road sign data, sensor data related to permissible driving directions, data about valid paths based on legally permissible road geometries or the like. The map database 105a may also include cartographic data and/or routing data. According to some example embodiments, the road segment data records may be links or segments representing roads, streets, or paths, as may be used in calculating a route or recorded route information for determination of one or more personalized routes. The node data may be end points corresponding to the respective links or segments of road segment data. For example, the node data may represent data for intersections. The road/link data and the node data may represent a road network, such as used by vehicles, for example, cars, trucks, buses, motorcycles, and/or other entities.

Optionally, the map database 105a may contain path segment and node data records or other data that may represent pedestrian paths or areas in addition to or instead of the vehicle road record data, for example. The road/link segments and nodes may be associated with attributes, such as geographic coordinates, legal travel directions (travel directions that the vehicles should follow while traveling on the road/link segments), street names, address ranges, lane level speed profile (historically derived speed limits for a lane), lane level maneuver pattern (lane change patterns at intersections), and other navigation related attributes, as well as POIs, such as fueling stations, hotels, restaurants, museums, stadiums, offices, auto repair shops, buildings, stores, parks, etc. The map database 105a may include data about the POIs and their respective locations in the POI records.

The map database 105a may additionally include data about places, such as cities, towns, or other communities, and other geographic features such as bodies of water, mountain ranges, etc. Such place or feature data may be part of the POI data or may be associated with POIs or POI data records (such as a data point used for displaying or representing a position of a city). In addition, the map database 105a may include event data (e.g., traffic incidents, construction activities, scheduled events, unscheduled events, etc.) associated with the POI data records or other records of the map database 105a. The map database 105a may additionally include data related to road signs, road obstacles, traffic objects and the like. The map database may be communicatively coupled to the processing server 105b.

In one embodiment, the map or geographic database 105a can be maintained by a content provider in association with the mapping platform 105 (e.g., a map developer). The map developer can collect geographic data to generate and enhance the geographic database 105a. There can be different ways used by the map developer to collect data. These ways can include obtaining data from other sources, such as municipalities or respective geographic authorities. In addition, the map developer can employ field personnel to travel by vehicle (e.g., vehicles and/or user terminals) along roads throughout the geographic region to observe features and/or record information about them, for example. Also, remote sensing, such as aerial or satellite photography, can be used.

The geographic database 105a can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle or a user terminal, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processing server 105b may comprise one or more processors configured to process requests received from the system 101. The processor may fetch map data from the map database 105a and transmit the same to the system 101 in a format suitable for use by the system 101. In some example embodiments, as disclosed in conjunction with the various embodiments disclosed herein, the system 101 may be used to detect the driving direction.

FIG. 2 illustrates a block diagram 200 of the system 101 for detecting the driving direction, in accordance with one or more example embodiments. The system 101 may include a at least one processor 201, a memory 203, and at least one communication interface 205. Further, the system 101 may comprise a path-based map-matcher 201a and a point-based map-matcher 201b. The path-based map-matcher 201a may comprise a sensor data reception module 201a-0, and a map-matching module 201a-1. The point-based map-matcher 201b may comprise a link determination module 201b-0, a direction determination module 201b-1, and a driving direction detection module 201b-2. In various embodiments, the sensor data reception module 201a-0 may be configured to receive sensor data associated with a plurality of locations. In various embodiments, the map-matching module 201a-1 may be configured to determine trajectory data associated with the plurality of locations and identify, based on the trajectory data, a set of unmatched locations from the plurality of locations. Further, in some embodiments, the path-based map-matcher 201a comprises an output module to output the identified set of unmatched locations to the point-based map-matcher 201b and/or to the mapping platform 105. In various embodiments, the link determination module 201b-0 is configured to receive the set of unmatched locations and determine a link associated with each location in the set of unmatched locations. In various embodiments, the direction determination module 201b-1 is configured to determine first heading data associated with the link and determine second heading data associated with each of the first predetermined number of unmatched locations in the set of unmatched locations. In various embodiments, the driving direction detection module 201b-2 is configured to compare the first heading data and each of the second heading data to detect the driving direction.

According to some embodiments, the path-based map-matcher 201a and the point-based map-matcher 201b are embodied in the processor 201. The processor 201 may retrieve computer program code instructions that may be stored in the memory 203 for execution of computer program code instructions, which may be configured for detecting the driving direction.

The processor 201 may be embodied in several different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally, or alternatively, the processor 201 may include one or more processors configured in tandem via the bus to enable independent execution of instructions, pipelining and/or multithreading.

Additionally, or alternatively, the processor 201 may include one or more processors capable of processing large volumes of workloads and operations to provide support for big data analysis. In an example embodiment, the processor 201 may be in communication with a memory 203 via a bus for passing information to mapping platform 105. The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the system 101 to carry out various functions in accordance with an example embodiment of the present invention. For example, the memory 203 may be configured to buffer input data for processing by the processor 201. As exemplarily illustrated in FIG. 2, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

In some embodiments, the processor 201 may be configured to provide Internet-of-Things (IoT) related capabilities to users of the system 101, where the users may be a traveler, a driver of the vehicle and the like. In some embodiments, the users may be or correspond to an autonomous or semi-autonomous vehicle. The IoT related capabilities may in turn be used to provide smart navigation solutions by providing real time updates to the users to take pro-active decision on wrong way driving detection, speed determination, lane-level speed determination, turn-maneuvers, lane changes, overtaking, merging and the like, big data analysis, and sensor-based data collection by using the cloud based mapping system for providing navigation recommendation services to the users. The system 101 may be accessed using the communication interface 205. The communication interface 205 may provide an interface for accessing various features and data stored in the system 101. For example, the communication interface may comprise I/O interface which may be in the form of a GUI, a touch interface, a voice enabled interface, a keypad and the like. For example, the communication interface may be a touch enabled interface of a navigation device installed in a vehicle, which may also display various navigation related data to the user of the vehicle. Such navigation related data may include information about upcoming conditions on a route, route display, alerts about vehicle speed, user assistance while wrong way driving, and the like.

FIG. 3A illustrates an exemplary working environment 300a of the system 101 for obtaining sensor data, in accordance with one or more example embodiments. As illustrated in FIG. 3A, the working environment 300a includes the system 101, the network 103, the mapping platform 105, a vehicle 301, a plurality of locations 323, and a complex road geometry. The complex road geometry includes a plurality of links such as a link 303, a link 305, a link 307, a link 309, and a link 311. As used herein, the 'link' (i.e. the links 303, 305, 307, 309, and 311) may be a road segment between two nodes (each node may represent an intersection). In various embodiments, the map database 105a of the mapping platform 105 may store a legal travel direction (also referred to as a valid travel direction) associated with each of the links 303, 305, 307, 309, and 311 as an attribute for each of the respective links 303, 305, 307, 309, and 311. In some embodiments, the map database 105a may store a travel direction 313 as the legal travel direction associated with the link 303. Similarly, a travel direction 315, a travel direction 317, a travel direction 319, and a travel direction 321 may be stored as the legal travel direction associated with the link 305, the link 307, the link 309, and the link 311 respectively. As used herein, the legal travel direction may indicate a direction in which the vehicle 301 should travel on a particular link.

The vehicle 301 may include a motor vehicle, a non-motor vehicle, an automobile, a car, a scooter, a truck, a van, a bus, a motorcycle, a bicycle, a Segway, and/or the like. The vehicle 301 may be an autonomous vehicle, a semiautonomous vehicle, or a manual vehicle. As used herein, the autonomous vehicle may be a vehicle that can sense its environment and operating without human involvement. For instance, the autonomous vehicle may be a self-driving car and the like. As used herein, the semiautonomous vehicle may be a vehicle that can sense its environment for lane keeping, self-parking, and the like. However, the semiautonomous vehicle may not have capability of self-driving. The vehicle 301 may be equipped with various sensors for generating or collecting sensor data. In some embodiments, the sensor data represent sensor data associated with a geographic location or coordinates at which the sensor data was collected. The sensors of the vehicle 301 may include a radar system, a LiDAR system, a global positioning sensor for gathering location data (e.g., GPS), temporal information sensors, orientation sensors augmented with height sensors, tilt sensors, and the like. The sensor data may be generated and reported in the form of high frequency GPS coordinates, so that the data reporting is frequent and near real-time. The frequency may be as high as 1 second in some cases, based on the capabilities of the sensors.

The sensors of the vehicle 301 may generate sensor data associated with each of the plurality of locations 323, while the vehicle 301 is traveling. The plurality of locations 323 may indicate locations of the vehicle 301 on a particular link (i.e. the link 303) while the vehicle 301 is traveling on the link. Further, the senor data associated with the plurality of locations 323 may be transmitted to the system 101. The system 101 may be triggered to be configured as the path-based map-matcher 201a and the point-based map-matcher 201b for detecting a driving direction of the vehicle 301 after receiving the sensor data associated with the plurality of locations 323. Further, the system 101 configured as the path-based map-matcher 201a and the point-based map-matcher 201b for detecting the driving direction is explained in the detailed description of FIG. 3B. The driving direction may be one of a right way driving, a wrong way driving or an uncertain driving. For instance, the system 101 may detect the driving direction as a right way driving if the vehicle is traveling on a link in a legal travel direction associated with the link, and the link in that case is the valid path for the vehicle; and may detect the driving direction as the wrong way driving if the vehicle is traveling on the link in a travel direction opposite to the legal travel direction associated with the link, and correspondingly the link becomes the invalid path for the vehicle. That is, when the vehicle 301 is traveling on the link 303 and the link 305 with the travel direction 313 and the travel direction 315 respectively, then the system 101 may detect the driving direction as the right way driving direction. When the vehicle 301 is traveling on the link 309 in a travel direction opposite to the travel direction 319, then the system 101 may detect the driving direction as the wrong way driving direction. The process of detecting driving direction in this manner, is further illustrated in FIG. 3B.

FIG. 3B illustrates an exemplary working environment 300b of the system 101 for detecting the driving direction, in accordance with one or more example embodiments. The system 101 may receive the sensor data associated with the plurality of locations 323. For instance, a sensor data reception module 201a-0 may be configured to receive the sensor data associated with the plurality of locations 323. In some embodiments, the system 101 may receive the sensor data at a predefined frequency (e.g. one Hertz). In other words, the system 101 may receive the sensor data associated with a location of the vehicle 301 (i.e. a location of the plurality of locations 323) for every second, while the vehicle 301 is traveling. The received sensor data, for each location in the plurality of locations 323, may comprise a high frequency GPS data, a timestamp data, a heading degree data, or a combination thereof. The high frequency GPS data includes location coordinate data. The timestamp data indicate a time instance at which a particular location coordinate data was collected by the sensors of the vehicle 301. The heading degree data includes a heading data of the vehicle 301, when the vehicle 301 was on a particular location. As used herein, the heading data may be an angle measured in degree or its equivalent from a north direction, a line-of-sight direction or the like in clockwise direction.

The system 101 may map-match, using the map data of the map-database 105a, the received sensor data associated with each location 323 to determine whether the vehicle 301 is traveling on the legal travel direction or not. For instance, the map-matching module 201a-1 of the path-based map-matcher 201a may be configured to map-match the received sensor data associated with each location 323 to determine whether the vehicle 301 is traveling on the legal travel direction, which is associated with a valid path, or not. For instance, the system 101 may check whether the heading degree data associated with each location 323 matches with the legal travel direction stored in the map database 105a to determine whether the vehicle 301 is traveling on the legal travel direction or not. In some embodiments, the system 101 may identify a matched location 325 for each location 323 if the vehicle 301 is traveling in the legal travel direction. As used herein, the matched location 325 may be a location map-matched by the path-based map-matcher 201a.

In this way, the system 101 may identify the matched location 325 for each of the plurality of locations 323 on the link 303 and on the link 305, as the vehicle 301 has travelled in the travel direction 313 and the travel direction 315 (which are the legal travel directions) on the link 303 and the link 305 respectively.

In some embodiments, the system 101 identifies a location of the plurality of location 323 as an unmatched location if the vehicle 301 is not traveling in the legal travel direction. For instance, the system 101 may identify locations (i.e. a location 323a, a location 323b, and a location 323c) of the plurality of locations 323 as a set of unmatched locations, if the vehicle 301 has entered the link 309 in a direction that does not match the travel direction 319 of the link 309. As used herein, the unmatched location may be a location of the plurality of locations 323 for which the path-based map-matcher 201a does not identify a map-matched location.

For instance, the system 101 may receive the sensor data associated with the location 323a of the plurality of location 323. Further, the system 101 may determine whether the vehicle is traveling in the legal direction (i.e. the travel direction 319 on the link 309) or not, based on map-matching the sensor data associated with the location 323a and the map database 105a. As the vehicle 301 is not traveling in the travel direction 319 (i.e. the legal direction) on the link 309, the system 101 may identity the location 323a as the unmatched location. Further, in some embodiments, the path-based map-matcher 201a may comprise an unmatched location counter. To that end, the system 101 may increase a counter value of the unmatched location counter by one after identifying the location 323a as the unmatched location. In other words, the system 101 may set the counter value of the unmatched location counter to '1' (assuming an initial counter value of the unmatched location counter='0') after identifying the location 323a as the unmatched location. In some embodiments, if the system 101 identifies a matched location between any two unmatched locations, then the system 101 may set the counter value of the unmatched location counter to '0'. The system 101 may determine whether the counter value of the unmatched location counter is greater than or equal to a first predetermined number. In some example embodiments, the first predetermined number may be a threshold value 'm' (for instance, 'm'='3') determined by experimentation and the like. In some other example embodiments, the first predetermined number may be the threshold value 'm' set by a user (i.e. a driver, a traveler, and the like) of the system 101.

Similarly, the system 101 may identify the location 323b as the unmatched location, as the vehicle is not traveling in the travel direction 319 (i.e. the legal direction) on the link 309; set the counter value of the unmatched location counter to '2' after identifying the location 323b as the unmatched location; and determine whether the counter value of the unmatched location counter is greater than or equal to the first predetermined number.

Similarly, the system 101 may identify the location 323c as the unmatched location, as the vehicle is not traveling in the travel direction 319 (i.e. the legal direction) on the link 309; set the counter value of the unmatched location counter to '3' after identifying the location 323c as the unmatched location; and determine whether the counter value of the unmatched location counter is greater than or equal to the first predetermined number.

The system 101 may identify the location 323a, the location 323b, and the location 323c as a set of unmatched locations 327, in response to determining that the counter value of the unmatched location counter is greater than or equal to the first predetermined number. To that end, the set of unmatched locations 327 comprises the first predetermined number of unmatched locations (i.e. the locations 323a, 323b, and 323c). Further, in some embodiments, the first predetermined number of unmatched locations in the set of unmatched locations 327 are consecutive locations of the plurality of locations 323. The use of the unmatched location counter may aid to ensure the first predetermined number of unmatched locations in the set of unmatched locations 327 are consecutive locations of the plurality of locations 323, because the system 101 may increase the counter value of the unmatched location counter by '1', if the system 101 identifies an unmatched location and further the system 101 may set the counter value of the unmatched location counter to '0', if the system 101 identifies a matched location between any two unmatched locations. To that end, the first determined number of unmatched locations in the set of unmatched locations 327 are the consecutive locations of the plurality of locations 323. The set of unmatched locations 327 thus identified, comprises those locations which are not aligned with the valid path data discussed previously.

In some embodiments, the system 101 may determine trajectory data associated with the locations 323*a*, 323*b*, and 323*c* of the plurality of locations 323, based on the sensor data associated with the locations 323*a*, 323*b*, and 323*c* and the map database 105*a*. In some example embodiments, the system 101 may determine a valid path data associated with the locations 323*a*, 323*b*, and 323*c* for determining the trajectory data, based on the sensor data associated with the locations 323*a*, 323*b*, and 323*c* and the map database 105*a*. In some example embodiments, the system 101 may determine the link 307 as the valid path data, because the vehicle 301 should have travelled through the link 307 to travel on the link 311, after travelling through the link 305. The system 101 may determine the valid path data (i.e. the link 307) as the trajectory data. The system 101 may determine a location associated with the trajectory data using the map database 105*a*. In some example embodiments, the location associated with the trajectory data may be a start location of the link 311.

Further, in some embodiments, the system 101 may determine a distance from each of the locations 323*a*, 323*b*, and 323*c* to the location associated with the trajectory data after determining that the vehicle is not travelling in the legal travel direction (i.e. the travel direction 319) on the link 309. The system 101 may compare each of the determined distances with a threshold distance. Further, the system 101 may identify the first predetermined number of unmatched locations (i.e. the locations 323*a*, 323*b*, and 323*c*) as the set of unmatched location 327, if each of the determined distances is greater than the threshold distance. To that end, the system 101 may accurately identify the first predetermined number of unmatched locations (i.e. the locations 323*a*, 323*b*, and 323*c*) as the set of unmatched location 327 such that false positive detections may be avoided. As used herein, the false positive detection may correspond to wrongly detect a right way driving direction as a wrong way driving direction. As used herein, the right way driving direction may indicate the vehicle 301 is travelling in the legal travel direction on a particular link. As used herein, the wrong way driving direction may indicate the vehicle 301 is not travelling in the legal travel direction on a particular link.

In some embodiments, the set of unmatched location 327 identified by the path-based map-matcher 201*a* may be forwarded to the mapping platform 105 and/or to the point-based map-matcher 201*b* for further processing.

The system 101 may determine a link associated with each of the first predetermined number of unmatched locations (i.e. the locations 323*a*, 323*b*, and 323*c*) in the set of unmatched locations 327. For instance, the link determination module 201*b*-0 of the point-based map-matcher 201*b* may receive the set of unmatched location 327 from the path-based map-matcher 201*a* and/or from the mapping platform 105; and further may map-match, using the map data of the map database 105*a*, each of the locations 323*a*, 323*b*, and 323*c* in the set of unmatched locations 327 for determining the link 309 as the link associated with each of the locations 323*a*, 323*b*, and 323*c*.

The system 101 may determine first heading data associated with the link 309, based on the map data of the map database 105*a*. For instance, the direction determination module 201*b*-1 of the point-based map-matcher 201*b* may determine the travel direction 319 (i.e. the legal travel direction) of the link 309 stored in the map database 105*a* as the first heading data.

The system 101 may determine second heading data associated with each of the locations 323*a*, 323*b*, and 323*c*. For instance, the direction determination module 201*b*-1 of the point-based map-matcher 201*b* may determine the heading degree data associated with each of the locations 323*a*, 323*b*, and 323*c* as the second heading data.

The system 101 may calculate a heading difference data between the first heading data and the second heading data of the location 323*a*. For instance, the driving direction detection module 201*b*-2 may calculate the heading difference data between the first heading data and the second heading data of the location 323*a*. Further, the system 101 may determine whether the heading difference data is within at least one of heading ranges illustrated in FIG. 3C.

FIG. 3C illustrates a graphical representation 300*c* of various heading ranges for detecting the driving direction, in accordance with one or more example embodiments. The graphical representation 300*c* illustrates four heading ranges, which are a first heading range 329, a second heading range 331, a third heading range 333, and a fourth heading range 335. These heading ranges 329-335 may be based on some threshold heading degree values, such as an upper threshold value and a lower threshold value for each heading range. The first heading range 329 may be a first heading threshold range with a heading degree range from a first upper threshold value of say three hundred and one degree (or its equivalent) to a first lower threshold value of say sixty degree (or its equivalent). The second heading range 331 may be a second heading threshold range with a heading degree range from a second upper threshold value of say sixty one degree (or its equivalent) to a second lower threshold value of say hundred and twenty degree (or its equivalent). The third heading range 333 may be a third heading threshold range with heading degree range from a third upper threshold value of say two hundred and forty one degree (or its equivalent) to a third lower threshold value of say three hundred degree (or its equivalent). The fourth heading range 335 may be a fourth heading threshold range with heading degree range from a fourth upper threshold value of say one hundred and twenty one degree (or its equivalent) to a fourth lower threshold value of say two hundred and forty degree (or its equivalent).

For instance, the system 101 may determine whether the heading difference data is within at least one of the first heading threshold range 329, the second heading threshold range 331, the third heading threshold range 333, and the fourth heading threshold range 335. If the heading difference data is within the first heading threshold range 329, the system 101 may detect a driving direction as a right way driving direction. As used herein, the driving direction may indicate a direction in which the vehicle 301 is traveling on a particular link. As used herein, the right way driving direction may indicate the vehicle 301 is travelling in the legal travel direction on a particular link. If the heading difference data is within the second heading threshold range 331 and/or is within the third heading threshold range 333, the system 101 may detect the driving direction as an uncertain driving direction. As used herein, the uncertain driving direction may indicate an uncertain condition that whether the vehicle 301 is traveling in the legal direction or not traveling in the legal direction on a particular link may not be detected.

Further, in some embodiments, the point-based map-matcher 201b may further comprise a wrong way driving counter. The system 101 may set the counter value of the wrong way driving counter to '0' if the driving direction is detected as the right way driving direction.

The system 101 may increase the counter value of the wrong way driving counter by '1', if the heading difference data is within the fourth heading threshold range 335. In other words, the system 101 set the counter value of the wrong way driving counter to '1' (assuming an initial counter value of the wrong way driving counter='0'), if the heading difference data is within the fourth heading threshold range 335. Further, the system 101 may compare the counter value of the wrong way driving counter with a predetermined counter threshold value. In some embodiments, the predetermined counter threshold value may be a threshold value 'n' determined by experimentation and the like. In some other embodiments, the predetermined counter threshold value may be the threshold value 'n' set by the user of the system 101. In some example embodiments, the first predetermined number and the predetermined counter value may have same value (i.e. 'm'='n'='3'). The system 101 may determine whether the counter value of the wrong way driving counter is greater than or equal to the predetermined counter threshold value. In some cases, when the heading difference data is within the second heading threshold range 331 or the third heading threshold range 333, the driving direction is the uncertain driving direction, and thus, the counter value of the wrong way driving counter is neither incremented, nor reset.

As long as the counter value of the wrong way driving counter is not greater than or equal to the predetermined counter threshold value, the system 101 may similarly calculate a heading difference data between the first heading data and the second heading data of the location 323b; increase the counter value of the wrong way driving counter by '1', if the heading difference data between the first heading data and the second heading data of the location 323b is within the fourth heading threshold range 335; and determine whether the counter value of the wrong way driving counter is greater than or equal to the predetermined counter threshold value.

As the counter value of the wrong way driving counter is not greater than or equal to the predetermined counter threshold value, the system 101 may similarly calculate a heading difference data between the first heading data and the second heading data of the location 323c; increase the counter value of the wrong way driving counter by '1', if the heading difference data between the first heading data and the second heading data of the location 323c is within the fourth heading threshold range 335; and determine whether the counter value of the wrong way driving counter is greater than or equal to the predetermined counter threshold value.

The system 101 may detect the driving direction as the wrong way driving direction, in response to determining that the counter value of the wrong way driving counter is greater than or equal to the predetermined counter threshold value. For instance, the system 101 may detect the driving direction as the wrong way driving direction, in response to determining that the counter value '3' of the wrong way driving counter is equal to the predetermined counter threshold value '3'. As used herein, the wrong way driving direction may indicate the vehicle 301 is not travelling in the legal travel direction on a particular link. According to some embodiments, the detection of the wrong way driving direction after determining the counter value of the wrong way driving counter is greater than or equal to the predetermined counter threshold value may aid the system 101 to accurately detect the driving direction as the wrong way driving direction such that the false positives are avoided.

Further, in some embodiments, the system 101 may generate a notification response, based on the detection of the wrong way driving. In other words, the system 101 may generate the notification response if the driving direction is detected as the wrong way driving direction. In some example embodiments, the notification response may comprise at least one of an alert message, an audio message indicating the wrong way driving, a visual message indicating the wrong way driving, and/or a navigation instruction related to the wrong way driving. Additionally, in some embodiments, the system 101 may generate control signal(s) to vehicle 301 if the driving direction is detected as the wrong way driving direction. In some embodiments, the control signals may comprise an instruction to switch the vehicle 301 from an automatic mode to a manual mode. Further, the control signals may comprise instructions, to the user or vehicle, regarding the valid path nearby (i.e. the link 307 or another link).

In this way, the system 101 may detect the driving direction, based on the sensor data collected from the sensors of the vehicle 301 such that the false positives are avoided and the unwanted conditions such as the road accidents, the head-on collisions of vehicles, the fatalities and the like are avoided irrespective of complexity of the road geometries and/or the atmospheric conditions.

FIG. 4A illustrates a flowchart depicting a method 400a for detecting the driving direction, in accordance with one or more example embodiments. It will be understood that each block of the flow diagram of the method 400a may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 203 of the system 101, employing an embodiment of the present invention and executed by the processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram 400a support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

Starting at block 401, the method 400a may comprise receiving the sensor data associated with the plurality of locations 323. For instance, the system 101 may receive the sensor data associated with the plurality of locations 323 as explained in the detailed description of FIG. 3B. The sensor data, for each location in the plurality of locations, may comprise the high frequency GPS data, the timestamp data, the heading degree data or a combination thereof.

At block 403, the method 400a may comprise determining the trajectory data associated with the plurality of locations 323 based on the sensor data and the map data of the map database 105a. For instance, the system 101 may determine the trajectory data associated with the plurality of locations 323 based on the sensor data and the map data of the map database 105a as explained in the detailed description of FIG. 3B. The trajectory data may comprise a path constructed using the plurality of locations 323.

At block 405, the method 400a may comprise identifying, based on the trajectory data, the set of unmatched locations 327 from the plurality of locations 323. For instance, the system 101 may identify, based on the trajectory data, the set of unmatched locations 327 from the plurality of locations 323 as explained in the detailed description of FIG. 3B. The set of unmatched points may comprise at least the first predetermined number of unmatched locations (i.e. the locations 323a, 323b, and 323c) which are not aligned with the valid path data.

At block 407, the method 400a may comprise detecting the driving direction based on the set of unmatched locations and the map data of the map database 105a. Further, the detection of the driving direction based on the set of unmatched locations and the map data of the map database 105a is explained in detailed description of FIG. 4B.

FIG. 4B illustrates a flowchart depicting a method 400b for detecting the driving direction based on the set of unmatched locations 327 and the map data, in accordance with one or more example embodiments. The method 400b may be used in conjunction with the system 101 described in the detail description of FIGS. 3A-3C. Although various steps of method 400b are described below and depicted in FIG. 4B, the steps need not necessarily all be performed, and in some cases may be performed in a different order than the order shown.

Starting at block 407a, the method 400b may comprise determining the link 309 associated with each of the at least first predetermined number of unmatched locations in the set of unmatched locations 327. For instance, the system 101 may determine the link 309 associated with each of the at least first predetermined number of unmatched locations in the set of unmatched locations 327 as explained in the detailed description of FIG. 3B.

At block 407b, the method 400b may comprise determining the first heading data associated with the link 309 based on the map data of the map database 105a. For instance, the system 101 may determine the first heading data associated with the link 309 based on the map data of the map database 105a as explained in the detailed description of FIG. 3B.

At block 407c, the method 400b may comprise determining the second heading data for each of the locations 323a, 323b, and 323c in the set of unmatched location 327, based on the sensor data. For instance, the system 101 may determine the second heading data for each of the locations 323a, 323b, and 323c in the set of unmatched location 327, based on the sensor data as explained in the detailed description of FIG. 3B.

At block 407d, the method 400b may comprise calculating the heading difference data between the first heading data and the second heading data for each of the locations 323a, 323b, and 323c. For instance, the system 101 may calculate the heading difference data between the first heading data and the second heading data for each of the locations 323a, 323b, and 323c as explained in the detailed description of FIG. 3B.

At block 407e, the method 400b may comprise detecting the driving direction based on the heading difference data of each of the locations 323a, 323b, and 323c. Further, the detection of the driving direction based on the heading difference data of each of the locations 323a, 323b, and 323c is explained in the detailed description of FIG. 4C.

FIG. 4C illustrates a flowchart depicting a method 400c for detecting the driving direction based on the heading difference data of each of the locations 323a, 323b, and 323c, in accordance with one or more example embodiments. The method 400c may be used in conjunction with the system 101 described in the detail description of FIGS. 3A-3C. Although various steps of method 400c are described below and depicted in FIG. 4C, the steps need not necessarily all be performed, and in some cases may be performed in a different order than the order shown.

Starting at block 407e-0, the method 400c may comprise obtaining the heading difference data of an unmatched location in the set of unmatched locations 327. For instance, the system 101 may obtain the heading difference data of an unmatched location in the set of unmatched locations 327.

At block 407e-1, the method 400c may comprise detecting the driving direction as the right way driving direction in response to determining that the heading difference data is within the first heading threshold range 329. For instance, the system 101 may detect the driving direction as the right way driving direction in response to determining that the heading difference data is within the first heading threshold range 329 as explained in the detailed description of FIG. 3B.

At block 407e-2, the method 400c may comprise detecting the driving direction as the uncertain driving direction in response to determining that the heading difference data is within at least one of the second heading threshold range 331 and a third heading threshold range 333. For instance, the system 101 may detect the driving direction as the uncertain driving direction in response to determining that the heading difference data is within at least one of the second heading threshold range 331 and a third heading threshold range 333 as explained in the detailed description of FIG. 3B.

At block 407e-3, the method 400c may comprise incrementing the counter value of the wrong way driving counter, in response to determining that the heading difference data is within the fourth heading threshold range 335. For instance, the system 101 may increment the counter value of the wrong way driving counter, in response to determining that the heading difference data is within the fourth heading threshold range 335 as explained in the detailed description of FIG. 3B.

At block 407e-4, the method 400c may comprise determining whether the counter value of the wrong way driving counter is greater than or equal to the predetermined counter threshold value. For instance, the system 101 may determine whether the counter value of the wrong way driving counter is greater than or equal to the predetermined counter threshold value as explained in the detailed description of FIG. 3B.

In response to determining that the counter value of the wrong way driving counter is not greater than or not equal to the predetermined counter threshold value, the method 400c may proceed with block 407e-0. In response to determining that the counter value of the wrong way driving counter is greater than or equal to the predetermined counter threshold value, the method 400c may proceed with block 407e-5.

At block 407e-5, the method 400c may comprise detecting the driving direction as the wrong way driving direction. For instance, the system 101 may detect the driving direction as the wrong way driving direction. Further, in some embodiments, the method 400c may comprise generating the notification response after detecting the driving direction as the wrong way driving direction. The notification response comprises at least one of the alert messages, the audio message indicating wrong way driving, the visual message indicating wrong way driving, and the navigation instruction related to wrong way driving.

On implementing the methods 400a-400c disclosed herein, the system may be configured to detect the driving direction, based on the sensor data collected from the sensors of the vehicle 301 such that the false positives are avoided and the unwanted conditions such as the road accidents, the head-on collisions of vehicles, the fatalities and the like are avoided irrespective of complexity of the road geometries and/or the atmospheric conditions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for detecting a driving direction, the system comprising:
 a memory configured to store computer-executable instructions; and
 one or more processors configured to execute the instructions to:
  receive sensor data associated with a plurality of locations;
  determine trajectory data associated with the plurality of locations based on the sensor data and map data;
  identify, based on the trajectory data, a set of unmatched locations from the plurality of locations, wherein the set of unmatched locations comprises at least a first predetermined number of unmatched locations; and
  detect the driving direction based on the set of unmatched locations and the map data.

2. The system of claim 1, wherein to detect the driving direction, the one or more processors are further configured to execute the instructions to:
 determine a link associated with each of the at least first predetermined number of unmatched locations in the set of unmatched locations; and
 determine first heading data associated with the link based on the map data.

3. The system of claim 2, wherein to detect the driving direction, the one or more processors are further configured to execute the instructions to:
 determine second heading data based on the sensor data, wherein the second heading data is associated with a vehicle associated with the sensor data;
 calculate a heading difference data between the first heading data and the second heading data; and
 detect the driving direction based on the heading difference data.

4. The system of claim 3, wherein to detect the driving direction, the one or more processors are further configured to execute the instructions to detect the driving direction as a right way driving direction in response to determining that the heading difference data is within a first heading range.

5. The system of claim 3, wherein to detect the driving direction, the one or more processors are further configured to execute the instructions to detect the driving direction as an uncertain driving direction in response to determining that the heading difference data is within at least one of a second heading range and a third heading range.

6. The system of claim 3, wherein to detect the driving direction, the one or more processors are further configured to execute the instructions to:
 determine whether the heading difference data is within a fourth heading range;
 increment a counter value based on the determination;
 compare the counter value with a predetermined counter threshold value; and
 detect the driving direction as a wrong way driving direction based on the comparison.

7. The system of claim 6, wherein the one or more processors are further configured to execute the instructions to generate a notification response based on the detection of the wrong way driving direction, wherein the notification response comprises at least one of an alert message, an audio message indicating wrong way driving, a visual message indicating wrong way driving, and a navigation instruction related to wrong way driving.

8. The system of claim 1, wherein the received sensor data for the plurality of locations comprises, for each location in the plurality of locations, a high frequency GPS data, a timestamp data, a heading degree data or a combination thereof.

9. The system of claim 1, wherein to determine the set of unmatched locations, the one or more processors are further configured to execute the instructions to:
 determine a valid path data associated with the plurality of locations based on the map data;
 determine the trajectory data associated with the plurality of locations based on the sensor data and the map data, wherein the trajectory data comprises data corresponding to an actual path constructed using the plurality of locations;
 compare the valid path data and the trajectory data; and
 determine the set of unmatched locations based on the comparison, wherein the set of unmatched locations comprise at least the first predetermined number of unmatched locations associated with the trajectory data that are not aligned with the valid path data.

10. The system of claim 9, wherein to identify the set of unmatched locations, the one or more processors are further configured to execute the instructions to:
determine a distance between each location from the plurality of locations and a location associated with the trajectory data;
compare the distance with a threshold distance; and
identify the first predetermined number of unmatched locations based on the comparison, wherein for each location in the first predetermined number of unmatched locations the distance is more than the threshold distance, and wherein the first predetermined number of locations are consecutive locations.

11. A method for detecting a driving direction, the method comprising:
receiving sensor data associated with a plurality of locations;
determining trajectory data associated with the plurality of locations based on the sensor data and map data;
identifying, based on the trajectory data, a set of unmatched locations from the plurality of locations, wherein the set of unmatched locations comprises at least a first predetermined number of unmatched locations; and
detecting the driving direction based on the set of unmatched locations and the map data.

12. The method of claim 11, wherein detecting the driving direction further comprises:
determining a link associated with each of the at least first predetermined number of unmatched locations in the set of unmatched locations; and
determining first heading data associated with the link based on the map data.

13. The method of claim 12, wherein detecting the driving direction further comprises:
determining second heading data based on the sensor data, wherein the second heading data is associated with a vehicle associated with the sensor data;
calculating a heading difference data between the first heading data and the second heading data; and
detecting the driving direction based on the heading difference data.

14. The method of claim 13, wherein detecting the driving direction further comprises detecting the driving direction as a right way driving direction in response to determining that the heading difference data is within a first heading threshold range, wherein the first heading threshold range is a heading degree range from a first upper threshold value to a first lower threshold value.

15. The method of claim 13, wherein detecting the driving direction further comprises detecting the driving direction as an uncertain driving direction in response to determining that the heading difference data is within at least one of a second heading threshold range and a third heading threshold range, wherein the second heading threshold range is a heading degree range from a second upper threshold value to a second lower threshold value, and wherein the third heading threshold range is a heading degree range from a third upper threshold value to a third lower threshold value.

16. The method of claim 13, wherein detecting the driving direction further comprises:
determining whether the heading difference data is within a fourth heading threshold range, wherein the fourth heading threshold range is a heading degree range from a fourth upper threshold value to a fourth lower threshold value;
incrementing a counter value based on the determination;
comparing the counter value with a predetermined counter threshold value; and
detecting the driving direction as a wrong way driving direction based on the comparison.

17. The method of claim 16, further comprising generating a notification response based on the detection of the wrong way driving direction, wherein the notification response comprises at least one of an alert message, an audio message indicating wrong way driving, a visual message indicating wrong way driving, and a navigation instruction related to wrong way driving.

18. The method of claim 11, wherein determining the set of unmatched locations further comprises:
determining a valid path data associated with the plurality of locations based on the map data;
determining the trajectory data associated with the plurality of locations based on the sensor data and map data, wherein the trajectory data comprises data corresponding to an actual path constructed using the plurality of locations;
comparing the valid path data and the trajectory data; and
determining the set of unmatched locations based on the comparison, wherein the set of unmatched locations comprise at least the first predetermined number of unmatched locations associated with the trajectory data that are not aligned with the valid path data.

19. The method of claim 18, wherein identifying the set of unmatched locations further comprises:
determining a distance between each location from the plurality of locations and a location associated with the trajectory data;
comparing the distance with a threshold distance; and
identifying the first predetermined number of unmatched locations based on the comparison, wherein for each location in the first predetermined number of unmatched locations the distance is more than the threshold distance, and wherein the first predetermined number of locations are consecutive locations.

20. A computer program product comprising a non-transitory computer readable medium having stored thereon computer executable instruction which when executed by one or more processors, cause the one or more processors to carry out operations for detecting a driving direction, the operations comprising:
receiving sensor data associated with a plurality of locations;
determining trajectory data associated with the plurality of locations based on the sensor data and map data;
identifying, based on the trajectory data, a set of unmatched locations from the plurality of locations, wherein the set of unmatched locations comprises at least a first predetermined number of unmatched locations; and
detecting the driving direction based on the set of unmatched locations and the map data.

* * * * *